May 13, 1941.   G. JENDRASSIK   2,241,782
GAS TURBINE
Filed July 5, 1938
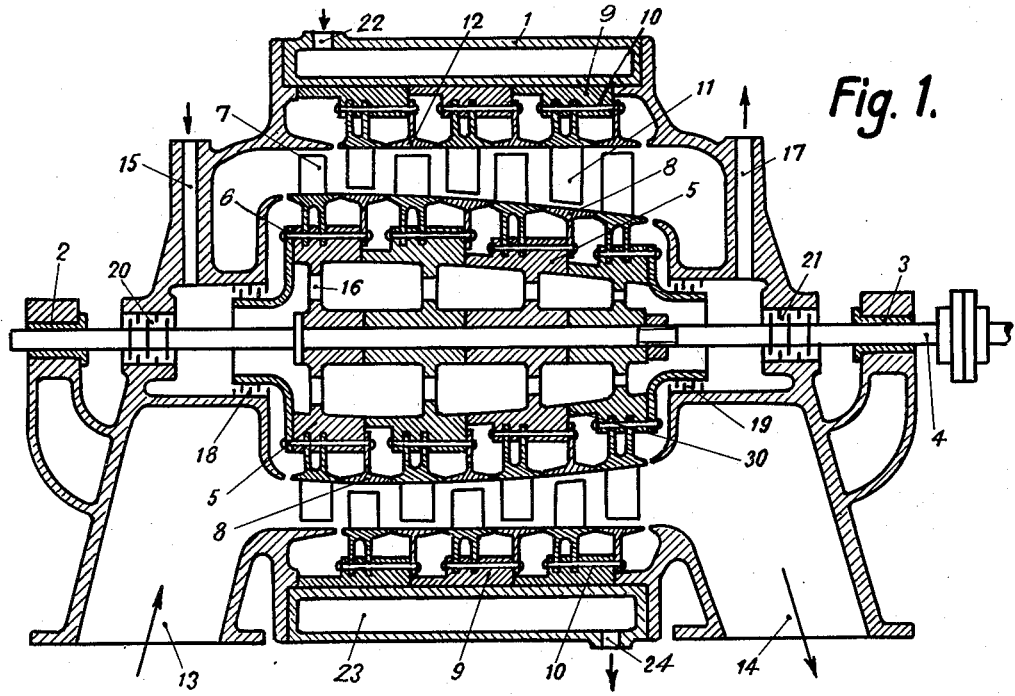
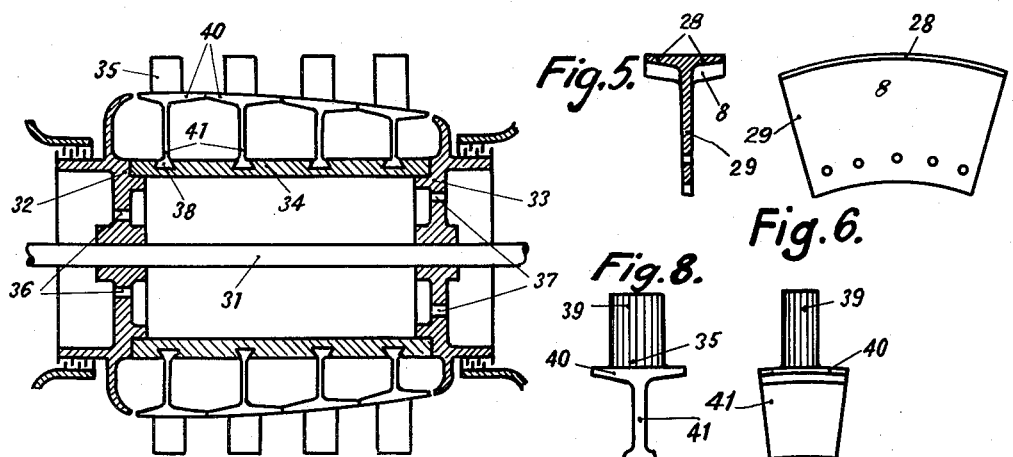
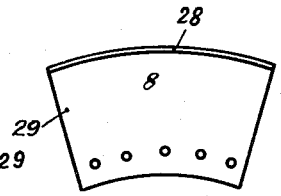
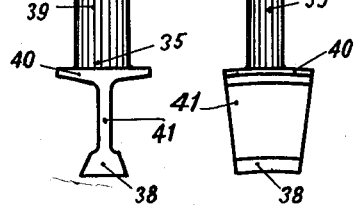
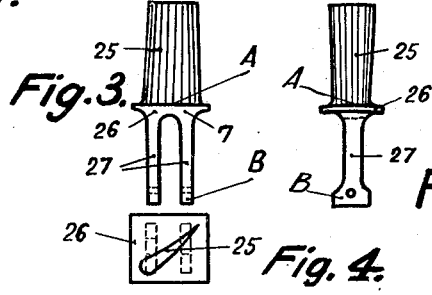
Witnesses:
Inventor:

Patented May 13, 1941

2,241,782

UNITED STATES PATENT OFFICE 2,241,782

GAS TURBINE

George Jendrassik, Budapest, Hungary

Application July 5, 1938, Serial No. 217,502
In Hungary July 7, 1937

8 Claims. (Cl. 253—69)

In the known proposals regarding gas turbines, the total efficiency of the gas turbine plant depends in a very substantial extent on the temperature of the working medium expanding in the turbine, and is all the more favourable, the higher the temperature of the working medium. A limit is set, however, to the increase of this temperature by the way in which the known kinds of constructional materials behave at high temperature; in fact, with the known kinds of materials it is not advisable to employ temperatures exceeding 500 to 600° C.

This is particularly true for gas turbines designed for a high peripheral velocity, in which the members—as discs, drums, etc.—supporting the blades and/or the intermediate pieces between the blades are subjected to so high stresses by the action of centrifugal force that in many cases it is not even the sensitivity of the materials of construction against any possible oxidation that causes difficulty, but rather the circumstance that at high temperatures only stresses of moderate magnitude are permissible in the said members. In addition hereto, it is also a troublesome fact that if high temperatures are employed very considerable amounts of expansion due to heat present themselves which are likewise disadvantageous from many points of view for the proper construction of the apparatus.

The invention relates to multi-stage gas turbines of a type in which the mean diameter of a stationary or rotating blade ring is—at least approximately—equal to the average of the mean diameters of the blade rings adjacent to it. In the case of a gas turbine of this type according to the invention it is possible to eliminate the disadvantages referred to above owing to the fact that the high gas temperatures determining the temperature of the turbine plant will only present themselves in such constructional members, like blades, as are in direct contact with the gases, and in such constructional parts, like the blade soles provided at the roots of the blades and possible distance pieces between the blade soles of two adjacent blade rings, as are forming, likewise in contact with the gases, the boundaries, along the flow, of the working space of the turbine, whereas those constructional parts (discs, drum, rings) by which the said members are supported are already of much lower temperature. In the gas turbine according to the invention this can be achieved in such a manner that the boundary walls of the flow space of the turbine are composed of separate plate-shaped pieces arranged in consecutive rings around the turbine shaft. In addition hereto, the said plate-shaped pieces are, at least in rings alternating with rings of similar pieces serving as the said distance pieces, made integral with the blades themselves so as to form the blade soles, and are, for the purpose of their connection with the constructional parts supporting them, provided with such leg extensions as are of sufficiently great length and of sufficiently small cross-section to ensure heat insulation against the absorption of heat from the working medium, and/or will sufficiently suppress the flow of heat through themselves, without being on their own part specially cooled, towards the rotor and the casing, respectively. Consequently, even in case the rotor and the casing are not cooled at all, or cooling in these parts takes place in a small extent only, the temperature drop between the gases and the supporting parts mentioned will be very substantial. In view of the fact that this circumstance enables the drawbacks mentioned above to be avoided, it is advantageous already in itself; moreover, a further advantage of this arrangement consists in the fact that owing to its heat-insulating effect it diminishes the heat losses, thereby exerting an advantageous influence on the efficiency of the turbine also.

In order to enable the invention to be more readily understood, Fig. 1 represents the longitudinal section of a gas turbine (turbine casing and rotor) shown by way of example; Figs. 2 to 4 represent the front, lateral and plan views of a type of blading shown by way of example, Figs. 5 and 6 show the cross-section and view of a distance piece, Fig. 7 is a section of another turbine rotor and blading shown by way of example, whilst Figs. 8 and 9 show the lateral and front views of a blade of this last-named blading.

In Fig. 1 there is arranged in the turbine casing 1 the rotor which is composed of the discs 5 etc. fixed on the shaft 4 journalled in the bearings 2 and 3. In this type of design, shown by way of example, the rotor carries the rotary blades 7 fixed by means of the rivets 6 to the discs 5, and the distance pieces 8 arranged between the rotary bladings.

The half-rings 9 arranged in the turbine casing carry the blades 11 as well as the distance pieces 12 fixed to the said half-rings by means of the rivets 10. The working medium of high pressure and of high temperature enters the turbine casing through the admission orifice 13 and, expanding in the turbine, leaves the latter through the discharge orifice 14. The admission duct 15 serves for the admission of the—preferably gaseous—medium employed for the internal cooling of the rotor; through this duct the gaseous cooling medium enters the interior of the rotor and, flowing through the latter through the openings 16 provided in the discs 5, leaves the turbine through the discharge duct 17. The packings 18, 19 serve for the mutual separation of the working medium and the cooling medium, whilst the stuffing-boxes 20 and 21 serve for separating the cooling medium from the ambient. In case it is desired to equip the stator of the turbine with artificial cooling, the cooling medium will, in the arrangement shown by way of example on the drawing, enter the cooling space 23 of the stator through the orifice 22 and will leave it through the discharge orifice 24.

In the case of the blades shown in Figs. 2 to 4 the blade part 25 in direct contact with the flow of gas carries at its root the flange-formed blade sole 26 which is continued in the leg or legs 27. These legs are fixed to the constructional parts supporting the blades, e. g. to the discs 5.

The distance-pieces shown in Figs. 5 and 6 are on their sides in contact with the current of gas, enlarged in width so as to form the flange 28 which is continued in the leg 29 which latter has to be fixed to the corresponding supporting part. Of a similar design are also the blades 11 and the distance-pieces 12, which are fixed, e. g. in the half-rings 9, with the differences that their corresponding radii of curvature are of the opposite sign.

The blade soles 26 and the flanges 28 of the distance-pieces shown, as the plate-shaped pieces referred to above, form a continuous surface intended to serve as a boundary for the flow of the working medium, notwithstanding the fact that the blades, or distance pieces respectively, form unconnected separate pieces. In view of the fact that the blades as well as the block soles and flanges referred to are in direct contact with the current of gas, the coefficient of heat transfer between them and the current of gas is very high. For the purpose of throttling the flow of heat absorbed, i. e. for insulating the supporting members, the legs 27 and 29 are made of so great length, and/or their cross-section is—within the limit permissible from the point of view of mechanical strength—diminished in such an extent as to cause them to offer a substantial amount of resistance against the flow of heat, and to serve, so to say, as heat insulators for the supporting parts. In the case of the distance pieces shown in Figs. 5 and 6 as well as in the case of the blades it is very essential, that they should be made of separate parts in the peripheral direction, as this will enable detrimental heat stresses due to non-uniform rise of temperature to be eliminated in a very great extent, nevertheless it is important that the leg extensions either of the blades or of the distance pieces (possibly of the blades as well as of the distance pieces) should in the peripheral direction fit closely to each other, so as to ensure that they would prevent in the manner, so to say, of a labyrinth packing, any flow of the working medium between the plates of different pressure of the turbine.

In view of the fact that, notwithstanding the effect of the legs made of thin cross-section and/or of increased length, a certain quantity of heat will continue to be transmitted to the supporting parts, it will be advisable, in order to keep the temperature of these parts at a low figure, to make provision for the cooling in a certain extent of the stator as well as of the rotor. The cooling of the rotor may be effected by means of a gaseous or liquid cooling medium, preferably by means of compressed air supplied by the compressor of the gas turbine plant, in which case the heat thus abstracted from the rotor does not indeed represent any loss at all.

It is, however, necessary to make provision for the internal space of the rotor being closed in a gas-tight manner towards the working space, this purpose being achieved in the type of design shown in Fig. 1 by the tight mutual fit of the flanges 30 of the discs, another possible arrangement being that in which it is not in the axial but in the radial direction that the tightly fitting flanges are placed on each other. The cooling of the stator may preferably be effected by means of a gaseous or liquid cooling medium which is introduced into the stator, it is, however, also possible to employ for this purpose the compressed working medium supplied by the compressor of the turbine plant. In case the heat loss is not of so great importance, the cooling of the stator may also be left to natural air convection.

In the type of design shown by way of example in Fig. 7, it is the drum 34, held by the discs 32 and 33 fixed on the shaft 31, that serves for accommodating the rotating blades 35. The cooling medium enters the drum through the orifices 36 and leaves it through the openings 37. In the case of this example of design it is not by means of rivets but by means of their dovetailed parts provided at the ends of the blade legs that the blades are fixed into the drum.

The blades 35 of the drum as per Fig. 7 are, as shown in two views in Figs. 8 and 9, provided at the root of their working surface 39 with the blade sole 40, the said blade soles forming, in the manner shown in Fig. 7 a continuous boundary wall for the stream of working medium. This blade sole passes on each blade into a leg 41 of reduced cross-section which ends in the dovetail 38.

The dimensions—i. e. the length and the cross-section—of the leg 41 are determined in such a manner as to ensure that the leg should function as a heat insulator.

In view of the fact that (as shown also by this last example) distance pieces are not employed necessarily in each case between the blade rings, it is important that in such a case the blade legs should mutually fit as tightly as possible in the peripheral direction.

As the blade legs are functioning as heat insulators relatively to the rotor as well as relatively to the stator, it is preferable to construct the said legs of a material the coefficient of heat conduction of which is low (if possible lower than the coefficient of heat conduction of wrought iron). Such a material is represented, for instance, by austenitic steel.

It is, further, a matter of course that the parts supporting the blades and the possible distance pieces may, owing to their reduced temperature, be made of usual material of construction, and only the blades and distance pieces, together with their leg extensions are such as ordinarily are to be made of special heat-resisting, i. e. of more expensive material.

The advantages offered by the invention may be illustrated by figures relating to an actual type of design. In the case of this type of design the temperature of the gas moving at a high speed and in contact with the blades is 600° C., the temperature of the blade roots at the point marked "A" in Figs. 2 and 3 being at the same time 555° C., whilst the temperature of the blade leg at the point "B" is 386° C. The temperature of the gas employed for the internal cooling of the rotor, which in this case is air of about 10 atmosphere pressure supplied by the compressor of the plant, is 300° C.

The temperature of the supporting members, which amounts to about 380° C., represents a figure which has been exceeded already even in the construction of steam turbines and thus causes no difficulty whatever. The heat loss amounts in the case of this arrangement to about 1% of the heat introduced, and in the blade leg serving as a heat insulator the temperature drop is 555−386=169° C.

The types of designs described in the specification should only be considered to represent arrangements described by way of example, so that any combinations of the same, as well as different types of construction embodying the same fundamental principles are all covered by the range of the invention. Thus, for instance, the turbine may be of axial or radial throughflow or of any intermediate type between these two extreme cases.

I claim:

1. In a multi-stage gas turbine, a casing, a rotor, two metallic walls for guiding the flow, connected constructionally to the said casing and rotor, respectively, so as to enclose intermediate insulating gas layers, and stationary and rotating turbine blades carried by the one and the other of the said guiding walls, each of the said walls being composed of separate plate-shaped pieces arranged in rings around the turbine axis and fitted closely together so as to form continuous lateral boundary surfaces for the streaming working medium in the expansion space of the turbine, and each of the said plate-shaped pieces being, for the purpose of their fastening to the constructional parts carrying them as the casing and the rotor, respectively, made integral with leg extension of such length and cross-section as to sufficiently suppress the flow of heat through themselves, without being on their own part specially cooled, towards the parts carrying them, and the blade rings of the turbine being united with a corresponding number of rings of the said plate-shaped pieces so that the said pieces should form the blade soles.

2. In a multi-stage gas turbine, a casing, a rotor, two metallic walls for guiding the flow, connected constructionally to the said casing and rotor, respectively, so as to enclose intermediate gas layers, and stationary and rotating turbine blades carried by the one and the other of the said guiding walls, each of the said walls being, in alternately consecutive rings around the turbine axis, composed of the blade soles and of separate plate-shaped distance pieces fitted closely together so as to form continuous lateral boundary surfaces for the streaming working medium in the expansion space of the turbine, and each of the said blades and distance pieces being, for the purpose of their fastening to the constructional parts carrying them as the casing and the rotor, respectively, made integral with leg extension of such length and cross-section as to sufficiently suppress the flow of heat through themselves, without being on their own part specially cooled, towards the parts carrying them.

3. In a multi-stage gas turbine, a casing, a rotor, two metallic walls for guiding the flow, connected constructionally to the said casing and rotor, respectively, so as to enclose intermediate gas layers and stationary and rotating turbine blades carried by the one end and the other of the said guiding walls, each of the said pieces being composed of separate plate-shaped pieces arranged in rings around the turbine axis and fitted closely together so as to form continuous lateral boundary surfaces for the streaming working medium in the expansion space of the turbine, and each of the said plate-shaped pieces being, for the purpose of their fastening to the constructional parts carrying them as the casing and the rotor, respectively, made integral with leg extension of such length and cross-section as to sufficiently suppress the flow of heat through themselves, without being on their own part specially cooled, towards the parts carrying them, and the blade rings of the turbine being united with the said rings of the plate-shaped pieces so that the said pieces should form blade soles which are suitably widened on both sides of the blade rings.

4. In a multi-stage gas turbine, a casing, a rotor having an internal cooling space made suitably tight against the working (expansion) space of the turbine, two metallic walls for guiding the flow, connected constructionally to the said casing and rotor, respectively, so as to enclose intermediate gas layers, and stationary and rotating turbine blades carried by the one and the other of the said guiding walls, each of the said walls being, in alternately consecutive rings around the turbine axis, composed of the blade soles and of separate plate-shaped distance pieces fitted closely together so as to form continuous lateral boundary surfaces for the streaming working medium in the expansion space of the turbine, and each of the said blades and distance pieces being, for the purpose of their fastening to the constructional parts carrying them as the casing and the rotor, respectively, made integral with leg extension of such length and cross-section as to sufficiently suppress the flow of heat through themselves, without being on their own part specially cooled, towards the parts carrying them.

5. In a multi-stage gas turbine, a turbine casing having an internal cooling space, a rotor having an internal cooling space made suitably tight against the working (expansion) space of the turbine, two metallic walls for guiding the flow, connected constructionally to the said casing and rotor, respectively, so as to enclose intermediate gas layers, and stationary and rotating turbine blades carried by the one and the other of the said guiding walls, each of the said walls being, in alternately consecutive rings around the turbine axis, composed of the blade soles and of separate plate-shaped distance pieces fitted closely together so as to form continuous lateral boundary surfaces for the streaming working medium in the expansion space of the turbine, and each of the said blades and distance pieces being, for the purpose of their fastening to the constructional parts carrying them as the casing and the rotor, respectively, made integral with leg extension of such length and cross-section as to sufficiently suppress the flow of heat through themselves, without being on their own part specially cooled, towards the parts carrying them.

6. In a multi-stage gas turbine, a turbine casing having an internal cooling space, a rotor composed of discs having an internal cooling space made suitably tight against the working (expansion) space of the turbine, mutually tightening flanges on the periphery of the rotor discs, openings in the rotor discs for the passage of the cooling medium, two metallic walls for guiding the flow, connected constructionally to the said casing and rotor, respectively, so as to enclose intermediate gas layers, and stationary and rotating turbine blades carried by the one and the other of the said guiding walls, each of the said walls being, in alternately consecutive rings around the turbine axis, composed of the blade soles and of separate plate-shaped distance pieces fitted closely together so as to form continuous lateral boundary surfaces for the streaming working medium in the expansion space of the turbine, and each of the said blades and distance pieces being, for the purpose of their fastening to the constructional parts carrying them as the casing and the rotor, respectively, made integral with leg extension of such length and cross-section as to sufficiently suppress the flow of heat through themselves, without being on their own part specially cooled, towards the parts carrying them.

7. In a multi-stage gas turbine, a casing, a rotor, two metallic walls for guiding the flow, connected constructionally to the said casing and rotor, respectively, so as to enclose intermediate gas layers, and stationary and rotating turbine blades carried by the one and the other of the said guiding walls, each of the said walls being, in alternately consecutive rings around the turbine axis, composed of the blade soles and of separate plate-shaped distance pieces fitted closely together so as to form continuous lateral boundary surfaces for the streaming working medium in the expansion space of the turbine, and each of the said blades and distance pieces being, for the purpose of their fastening to the constructional parts carrying them as the casing and the rotor, respectively, made integral with leg extension of such length and cross-section as to sufficiently suppress the flow of heat through themselves, without being on their own part specially cooled, towards the parts carrying them, and the leg extensions of the said blades and distance pieces in at least the one of each two adjacent rings containing them being fitted closely in the peripheral direction so as to prevent leakage.

8. In a multi-stage gas turbine, a casing, a rotor, two metallic walls for guiding the flow, connected constructionally to the said casing and rotor, respectively, so as to enclose intermediate gas layers, and stationary and rotating turbine blades carried by the one and the other of the said guiding walls, each of the said walls being, in alternately consecutive rings around the turbine axis, composed of the blade soles and of separate plate-shaped distance pieces fitted closely together so as to form continuous lateral boundary surfaces for the streaming working medium in the expansion space of the turbine, and each of the said blades and distance pieces being, for the purpose of their fastening to the constructional parts carrying them as the casing and the rotor, respectively, made integral with leg extension of such length and cross-section as to sufficiently suppress the flow of heat through themselves, without being on their own part specially cooled, towards the parts carrying them, and the blades and distance pieces being made, together with their leg extensions, of materials having a lower heat conductivity than wrought iron.

GEORGE JENDRASSIK.